United States Patent [19]

Costales et al.

[11] 3,997,729
[45] Dec. 14, 1976

[54] PSEUDO-RANDOM SEQUENCING FOR SPEECH PREDICTIVE ENCODING COMMUNICATIONS SYSTEM

[75] Inventors: René Costales; Joseph Albert Sciulli, both of Rockville, Md.

[73] Assignee: Communications Satellite Corporation (Comst), Washington, D.C.

[22] Filed: July 25, 1975

[21] Appl. No.: 599,228

[52] U.S. Cl. .................... 179/15 AS; 179/15 BW
[51] Int. Cl.² ......................................... H04J 6/02
[58] Field of Search ...... 179/15 AS, 15 BA, 15 BV, 179/15 BW

[56] References Cited
UNITED STATES PATENTS

| | | | |
|---|---|---|---|
| 3,311,707 | 3/1967 | Urquhart-Pullen | 179/15 AS |
| 3,560,660 | 2/1971 | Poretti | 179/15 AS |
| 3,864,524 | 2/1975 | Walker | 179/15 AS |
| 3,927,268 | 12/1975 | Sciulli | 179/15 BW |

*Primary Examiner*—David L. Stewart
*Attorney, Agent, or Firm*—Sughrue, Rothwell, Mion, Zinn and Macpeak

[57] ABSTRACT

Bit rate compression in a digital communications system is provided by transmitting voice information from $n$ telephone circuits over the capacity conventionally allocated for transmission of voice information from $n/2$ circuits without appreciable degradation in quality. Alternatively, a doubling of the number of voice circuits may be provided with transmission at the same bit rate required for conventional digital transmission of voice information. Each frame period, at the transmitter, all $n$ circuits are serviced and, utilizing a predictive encoding scheme, only unpredictable samples in the given frame are transmitted over the available channel capacity. A sample assignment word (SAW), which identifies the circuits corresponding to the unpredictable samples, is transmitted therewith. Upon reception of the transmitted frame comprising the SAW and the unpredictable samples, the receiver updates the stored samples which were transmitted during previous frames as unpredictable samples by substituting the received unpredictable samples for the stored samples in accordance with the channel routing information provided by the transmission capacity conventionally allocated for transmission of digital voice information from the SAW, thereby enabling proper reconstructions of all samples in the given frame. A pseudo-random priority sequencing system is provided for effectively recirculating the servicing sequence of the $n$ circuits to alleviate "overload". Means are also provided to insure proper reception of the SAW by the receiver.

6 Claims, 11 Drawing Figures

INPUT UNIT

SAW UNIT

SPEC RECEIVER

PSEUDO-RANDOM SEQUENCING FOR SPEECH PREDICTIVE ENCODING COMMUNICATIONS SYSTEM

BACKGROUND OF THE INVENTION

1. Field of the Invention

This invention relates to multi-channel communications systems employing a redundancy removal scheme using predictive encoding of speech in a digital, multi-channel communications system for the purpose of bit rate reduction with no appreciable degradation in voice quality, and more particularly, to an improved priority sequencing technique which obtains a closer to random distribution over a smaller number of transmitted frames for use in such systems.

2. Description of the Prior Art

In communicatins systems using long and expensive transmission facilities, such as submarine cables and satellite communications systems, terminal facilities which insure optimum utilization of the transmission channels are very important. A well-known analog system, the Time Assignment Speech Interpolation (TASI) system achieves communications efficiency, i.e. bandwidth compression, by means of a transmission time savings. The TASI system takes advantage of the statistical fact that during a telephone conversation a one-way telecommunications channel is active only on the average of about 50% of the time. The TASI system monitors each voice circuit for voice activity and, in response to the detection of voice, connects a talker to an available channel. In this manner, a number of talkers greater than the number of available channels may be serviced by sharing the channels on a talkspurt interpolated basis.

The quality of speech transmitted by TASI is effected by three main sources of degradation. First, degradation occurs due to interpolation. If the number of talkers simultaneously talking in one direction exceeds the number of available channels, a certain number of these talkers will be temporarily denied a channel. This condition is known as "freeze-out". The portion of speech not being transmitted by a talker who is temporarily "frozen-out" results in speech quality degradation. Second, degradation occurs due to the operation time of speech detectors, there being one speech detector for each voice circuit. Prior to connecting a voice circuit to an available channel the voice detector must detect speech activity in the voice circuit. During the time required for the voice detector to actually detect voice, the talker's speech signals are lost causing further degradation of voice quality. Third, degradation is due to speech signals being lost during the time needed for switching and signalling functions to establish the proper connection between talker and listener once speech activity is detected by the voice detector.

There are many characteristics of the speech predictive encoding communication (SPEC) system which represent improvements over prior art TASI system. These improvements are the subject of an application filed by Joseph A. Sciulli, Samual J. Campanella and Rene Costales on Feb. 28, 1973, Ser. No. 336,589, now U.S. Pat. No. 3,927,268 which issued Dec. 16, 1975, and which is a continuation of an application filed Apr. 30, 1971, Ser. No. 139,106, now abandoned, both of said applications being assigned to a common assignee with the present application. First, the SPEC system achieves bandwidth reduction by accommodating the traffic of $n$ telephone circuits in the capacity of $n/2$ telephone channels with no noticeable degradation in received voice quality. Secondly, the SPEC system, being an all digital system, makes decisions on each voice circuit at the basic sampling rate. For this reason, the transmission of data within the voice band, which is a difficult task for TASI-like systems, is easily accommodated. Third, the SPEC system employs a predicitive encoding scheme which significantly reduces, by about 15%, the average activity factor (defined as the number of voice samples transmitted/the total number of voice samples) over prior systems without any appreciable loss in voice quality. Fourth, whereas the effect of "freeze-out" in TASI-like systems manifests itself as a "chopping" or "clipping" of the voice signal which can result in the loss of an entire syllable, the effect of "overload" (i.e. freezeout) in the SPEC system results only in an amplitude error (as opposed to a "clip") in the received voice signal. In an "overload" condition the system does not really "freeze-out" samples from the voice circuits "frozen-out" since those circuits will have corresponding voice samples stored at the receiver whereby the receiver can reconstruct replicas of the "frozen-out" samples. Fifth, the SPEC utilizes a parity check scheme for protecting the transmitted voice samples thereby reducing the effect of errors (resulting in small amplitude error) caused by channel noise. Sixth, the SPEC system is built in a modular configuration (i.e., 64 circuits serviced by 32 circuits) to permit easy expansion to large capacities. Seventh, the flexibility of the SPEC system allows transmission in either time division multiplex-frequency division multiple access (TDM-FDMA) systems or time division multiplex-time division multiple access (TDM-TDMA) systems. Eighth, the SPEC system can be used in a point-to-multipoint fashion in satellite communications. Any station can transmit voice information to several other stations while each of the other stations would use a receiver which only uses the specific voice circuits addressed to it. In this manner larger amounts of telephone traffic destined for multiple stations can be interpolated at the transmitter of a single station. Finally, the implementation of the SPEC system results in a lower cost per circuit as well as higher quality service than prior art systems such as TASI.

In the SPEC system, bit rate compression in a digital, multi-channel, voice communications system is accomplished while maintaining normal voice transmission quality. The system is designed to transmit all $n$ telephone circuits over the transmission capacity conventionally allocated for digital transmission of all voice information from $n/2$ circuits. All no voice circuits are sampled at a rate, known as the frame rate, of one voice circuit every 125 $\mu$secs. Each voice sample in a frame period is compared at the transmitter with the corresponding voice sample of a previous frame stored in a predictive frame memory (PFM). If the comparison indicates that the present sample is predictable from the corresponding previous sample, a logic "0" is generated indicating that the present sample need not be transmitted. If the comparison indicates that the present sample is unpredictalbe from the corresponding previous sample, then a logic "1" is generated indicating that the unpredictable sample should be transmitted.

Transmission of the unpredictable samples is accomplished in the following manner. A frame of information equivalent in bit rate to that required for conventional digital transmission of all voice information from $n/2$ voice circuits comprises the essential information and is formed at the transmitter. Assuming $n = 64$, the transmission frame comprises 24, eight bit time slots $T_1$ thru $T_{24}$ designated for transmission of unpredictable samples and eight, eight bit time sots $T_{25}$ thru $T_{32}$ occupied by a 64 bit sample assignment word (SAW). The SAW informs the receiver as to which of the 64 voice circuits the unpredictable samples $T_1 - T_{24}$ belong.

As the comparisons are made at the transmitter, the first comparison indicating an unpredictable sample results in that sample being placed in time slot $T_1$. If that sample is from voice circuit 3, for example, then the SAW will have "0" in its first and second bit slots and a "1" in the third bit slot. If the next voice circuit indicative of unpredictability is, for example, voice circuit 6, then that unpredictable sample will be placed in time slot $T_2$, and the SAW will have "0" bits in bit slots 4 and 5 and a "1" in bit slot 6. This operation continues until 64 comparisons have been made and the unpredictable samples placed in the available time slots $T_1 - T_{24}$.

The receiver already has stored therein, 64 voice samples, which were transmitted during previous frames as unpredictable samples. When the receiver receives the presently transmitted information, including the sample assignment word, it then updates the corresponding 64 voice samples stored therein by substituting the unpredictable voice samples for the stored voice therein by substituting the unpredictable voice sample for the stored voice samples in accordance with the channel routing information provided by the SAW. The receiver is then in a position to properly reconstruct the present frame of all 64 voice samples.

The system is designed around the statistics of speech such that on the average in a system of 64 voice circuits of information, only 24 voice circuits will be non-redundant. However, there will be times when there is non-redundancy, i.e., unpredictability, in more than 24 voice circuits thereby resulting in an "overload" condition for those circuits which number above the 24 time slots available for transmission on that particular frame. The SPEC system alleviates "overload" in two ways. First, if an unpredictable sample is not transmitted because time slots $T_1$ thru $T_{24}$ are filled, the receiver utilizes the corresponding previous sample stored at the receiver for reconstructions of the unpredicable sample which could not be transmitted. Through the corresponding previous sample is being reconstructed as the unpredictable sample, the fact is the corresponding previous sample stored at the receiver should be close in value to the unpredictable sample which could not be transmitted. Secondly, the subjective effects of "overload" are alleviated by effectively recirculating the servicing sequence. For example, during frame 1 the voice circuits are serviced at the transmitter in sequence from 1 to 64. During the next frame, the voice circuits are effectively serviced in sequence starting with voice circuit 2; voice circuit 1 being the 64th circuit to be serviced; and so on. This recirculation of the servicing sequence continues so that in a period of 64 frames each circuit has had the opportunity to be serviced at each priority level (i.e. first to 64th). In this manner, if the system is operating under "overload" conditions the higher numbered circuits are not always serviced last since effectively those circuits become the lower numbered circuits on successive frames.

SUMMARY OF THE INVENTION

The recirculation of the servicing sequence in SPEC gives an average priority of service of $n/2$ to each trunk, but only after $n$ frames. According to the present invention, a pseudo-random servicing sequence is provided which can approximate the $n/2$ average priority of service in less than $n$ frames. This feature results in much improved subjective reactions to overload since the occurance of the error due to overload is more randomly distributed over all trunks and, therefore, should be less subjectively damaging to the received voice quality. Moreover, the advantage of the pseudo-random servicing sequence technique according to the invention as contrasted with merely recirculating the service sequence increases significantly as $n$ is increased.

These and other objects are accomplished by providing at the transmitter two pseudo-random generators, one generating the starting point or count in the other. Each pseudo-random generator comprises a binary counter having a plurality of stages and counting in response to a local clock. Selected stages of the binary counter are fed back through an Exclusive OR circuit to the input of the counter, thereby generating the pseudo-random output. The output of the first counter is periodically loaded in parallel into the second counter. The contents of the first counter at any particular point in time are termed the "sequence word" and constitute the starting point for the second counter. The second counter counts under the control of a clock having a frequency which is a power of two multiplied by the frequency of the clock controlling the first counter. The output of the second counter is the SAW priority sequence. There is additionally provided means to detect an "all-ones" state in the second pseudo-random generator to inhibit the second counter one clock pulse since pseudo-random generators can never generate the "all-zeros" output state.

The SAW in the priority determined by the output of the second counter is transmitted each sampling period. During these sampling periods when no "overload" condition exists, the sequence word in the first counter is transmitted in one of the available time slots to permit re-synchronization of a pseudo-random generator at the receiver. The receiver's pseudo-random generator is identical with the pseudo-random sequence generator in the transmitter. The first counter in the receiver's pseudo-random sequence generator is periodically re-synchronized by being set with the starting point or count in the transmitter's first counter, and thereafter the second counter in the receiver's pseudo-random sequence generator counts in synchronism with the transmitter's second counter to generate the correct pseudo-random priority sequence of the SAW. Alternatively, the de-synchronization may be accomplished at the transmitter before a frame is transmitted. In this case, no pseudo-random sequence generator is required at the receiver, and significant simplifications in the memory control units of both transmitter and receiver may be realized.

BRIEF DESCRIPTION OF THE DRAWINGS

The specific nature of the invention, as well as other objects, aspects, uses and advantages thereof, will clearly appear from the following description and from the accompanying drawings, in which.

DETAILED DESCRIPTION OF THE DRAWINGS

Figure 1:
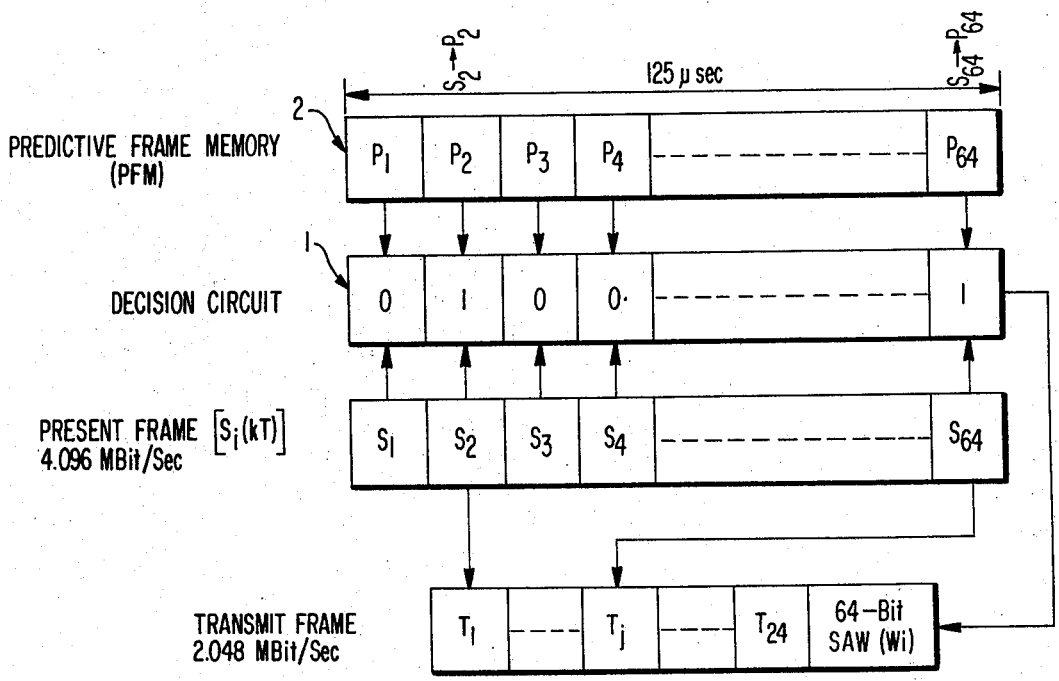
FIG. 1 is a diagram showing functionally the manner in which bit rate compression is achieved in a digital, multi-channel communications system using a redundancy removal scheme.

Referring to FIG. 1 there is shown functionally the manner in which bit rate compression is achieved in a digital, multichannel communications system using redundancy removal techniques. During one frame, $n$ voice circuits are sampled and each sample $S_i(kT)$, a present sample, is fed to a decision circuit 1 shared by all the voice circuits. In decision circuit 1, the present sample $S_i(kI)$ is compared with $\hat{S}_i(kT)$. $\hat{S}_i(kT)$ is set equal to $P_i$ which is the corresponding previous sample stored in predictive frame memory (PFM) 2. Upon comparison, if the difference between the present sample $S_i(kT)$ and the predictive value $\hat{S}_i(kT)$ is greater than a predetermined threshold. $\zeta$, it is an indication that the present sample $S_i(kT)$ cannot be adequately predicted from the corresponding value $S_i(kT)$. Therefore, the present sample $S_i(kT)$ must be transmitted. The decision circuit 1 transfers the unpredictable, present sample $S_i(kT)$ to the ith location in the predictive frame memory 2 wherein $S_i(kT)$ replaces $P_i$. If the difference between $S_i(kT)$ and $\hat{S}_i(kT)$ is less than or equal to the predetermined threshold$\tau$, then $S_i(kT)$ need not be transmitted, and the value $\hat{S}_i(kT) = P_i$ remains in PFM 2. The decision circuit 1 also generates a logic "1" for every unpredictable sample $S_i(kT)$ and a logic "0" for every predictable sample $S_i(kT)$. The series of "1's" and "0's" comprises the sample assignment word (SAW) which is part of the frame information to be transmitted. Each time a "1" is generated, the associated unpredictable, present sample $S_i(kT)$ is placed in an available time slot $T_j$ of the transmission frame. The prediction rules are summarized as shown in FIG. 1.

After all $n$ voice circuits are processed, a frame of information comprisng the unpredictable present samples and the SAW which identifies the voice circuits associated with the unpredictable, present samples is transmitted. At the receiver, as will be further described, the transmitted information is used to update a predictive frame memory (PFM) which provides a sample every $125\mu$ sec. to reconstruct speech in each of the $n$ voice circuits.

In the SPEC system, it is possible to transmit $n$ voice circuits over $n/2$ channels. Assuming $n = 64$ wherein speech on each voice circuit is quantized into eight bits the normal bit rate would be equal to $64 = 8 = 8$ khz (the Nyquish sampling rate) $= 4096$ k bits/sec. The SPEC system, however, utilizes only time slots $T_1 - T_{24}$ (eight bits each) of voice information plus eight time slots $T_{25} - T_{32}$ (eight bits each) for the SAW. The bit rate is then ½ of the normal rate or $(24 + 8$ time slots$) \times (8$ bits/time slot$) \times 8$ khz $= 2048$ k bits/sec. The 2:1 compression ratio is achieved by applying to each of the $n$ channels the predictive encoding algorithm called a zero-order predictor, well known in the art, and described above.

Although the efficiency of this system relies on the redundant qualities of speech, all of the trunks serviced by the present invention need not be voice circuits. The disclosed system would be operative to provide an efficient use of trnsmission capacity where a small percentage of the input trunks contaned digital data. The transmission of digital data would be based on standard techniques known to those skilled in the art.

Figure 6:
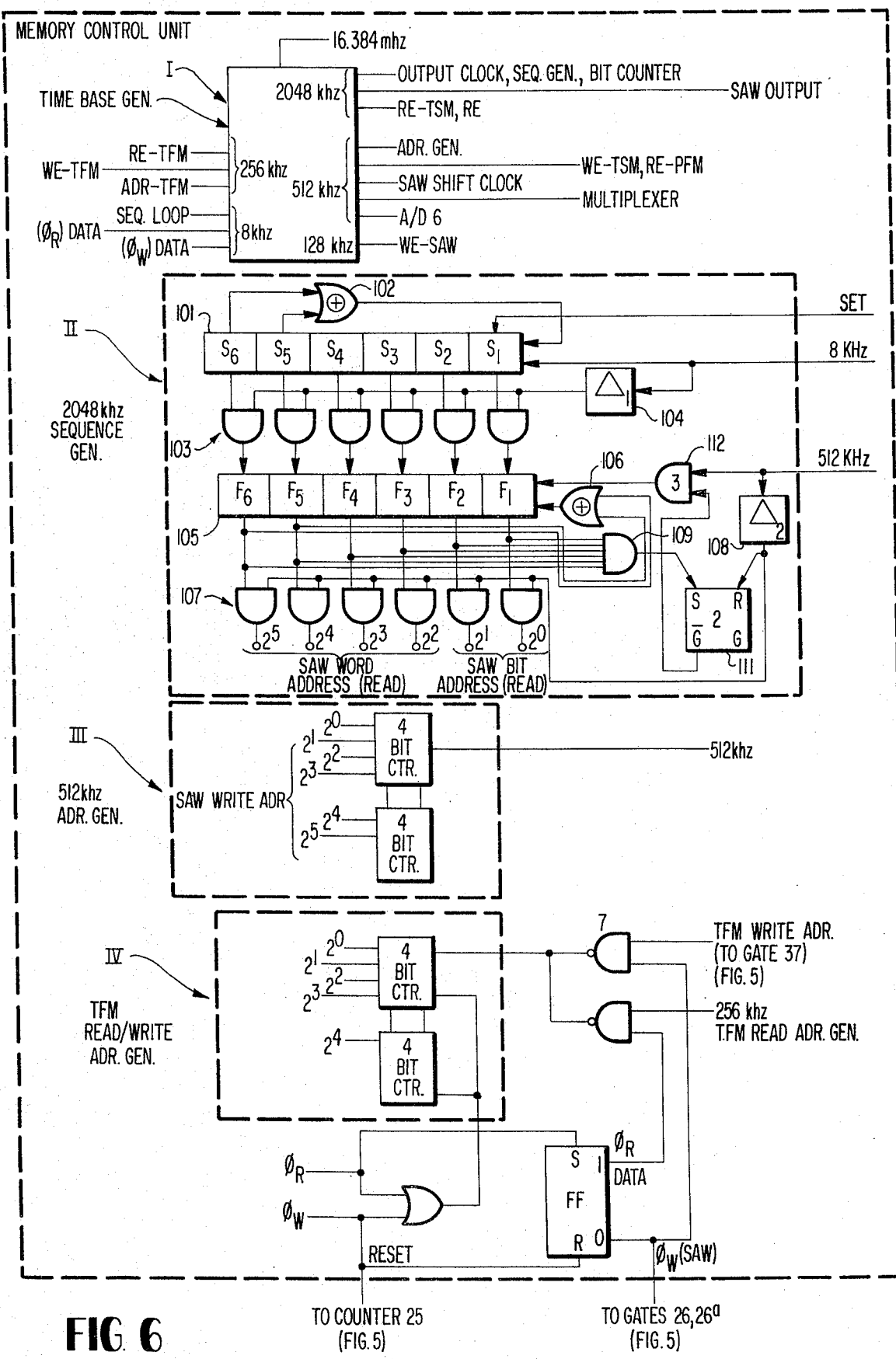
FIG. 6 is a schematic diagram of a memory control unit of the transmitter which provides the necessary timing and addressing functions for the transmitter including the pseudo-random sequence generator according to the present invention.
Figure 10:
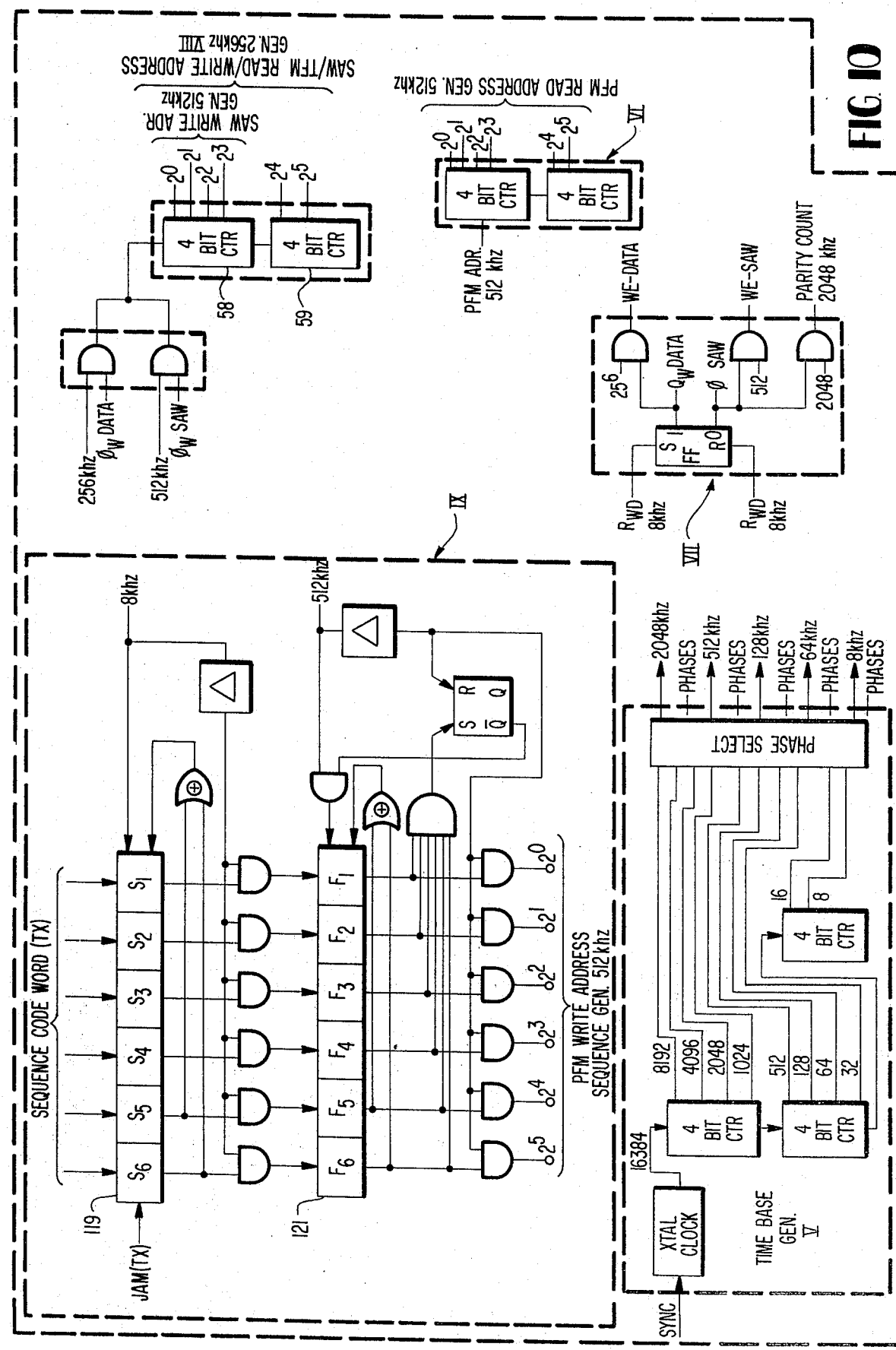
FIG. 10 is a schematic diagram of the memory control unit of the receiver which provides the necessary timing and addressing functions for all units of the receiver.

In continuing with a discussion of the SPEC system and the present invention, references will be made to FIGS. 6 and 10 of the drawings while discussing in detail other Figures of the drawings. FIG. 6 shows the memory control unit for the transmitter which provides the basic timing and addressing information. For example, there is shown in FIG. 6 a time base generator I which generates the necessary timing functions of the transmitter units. The abbreviations shown in the time base generator I and other units of the memory control unit will become apparent from the further discussion of the SPEC system. For example, WE-TFM refers to write enable-transmit frame memory; RE-PFM refers to read enable-predictive frame memory. Also shown are groups III and IV of four-bit counters which provide necessary addressing information for the transmitter units. For example, IV provides addressing information for the TFM (transmit frame memory) of the transmitter. II is the pseudo-random sequence generator according to the present invention. The individual units at the transmitter serviced by the several units of the memory control unit are appropriately referenced as to addressing information received and clocking periods of the addresses. The above is also true with respect to the memory control unit (FIG. 10) of the receiver. For example, the memory control unit has a time base generator V synchronized with time base generator I of FIG.6 and a predictive frame memory (PFM) address generator VI which addresses the predictive frame memory of the receiver.

Figure 2:
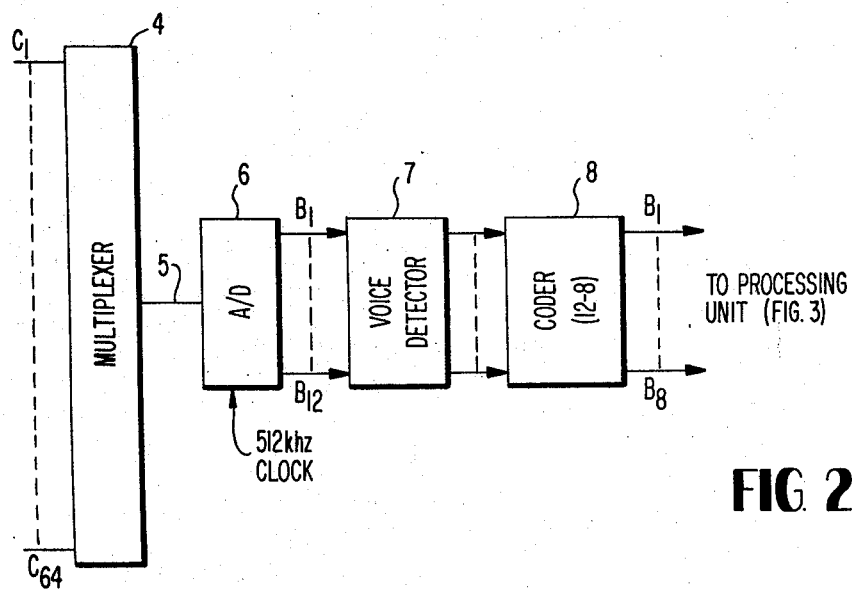
FIG. 2 is a block diagram of part of the equipment used at the transmitter.

Referring to FIG. 2 there is shown a block diagram of part of the apparatus of the SPEC system used at the transmitter. A multiplexer 4, known in the art, receives analog voice information on 64 parallel voice circuits $C_1 - C_{64}$ and multiplexes the information in a time series for transmission over line 5 to analog/digital converter 6. Analog/digital converter 6, which is a linear encoder, encodes the analog signal from each voice circuit $C_1 - C_{64}$ into a digital code word $S_i(kT)$ (present sample) comprising 12 parallel bits $B_1 - B_{12}$ at the clock rate of 64 × 8khz = 512 hz. Each 12 bit, digital code word $S'_i(kT)$ is then fed to a digital voice detector 7 (shared by all circuits $C_1$–$C_{64}$) which is used to minimize the unnecessary transmission of noise. Digital voice detector 7 may be of a type described in U.S. Pat. No. 3,712,959 entitled "Method And Apparatus For Detecting Speech In The Presence Of Noise", issued to Ettore Fariello. Actually, since the signals from the voice circuits are time division multiplexed, the voice detector of the referenced patent would be adapted for use in the SPEC system to have common voice detection circuitry for circuits $C_1$ – $C_{64}$; however, there would be individual hangover time storage for each such voice circuit. Each digital code word is then fed to a 12/8 Digitally Linearizable Coder 8, known in the art, which compresses the 12 bit digital code word $S'_i(kT)$ to an eight bit $B_1$ – $B_8$ digital code word $S_i(kT)$. The conversion of the analog signal into a 12 bit digital code word by a linear encoder 6 companded to an eight bit digital code word by coder 8 is required, as is well known, to obtain a desired companding characteristic.

Figure 3:
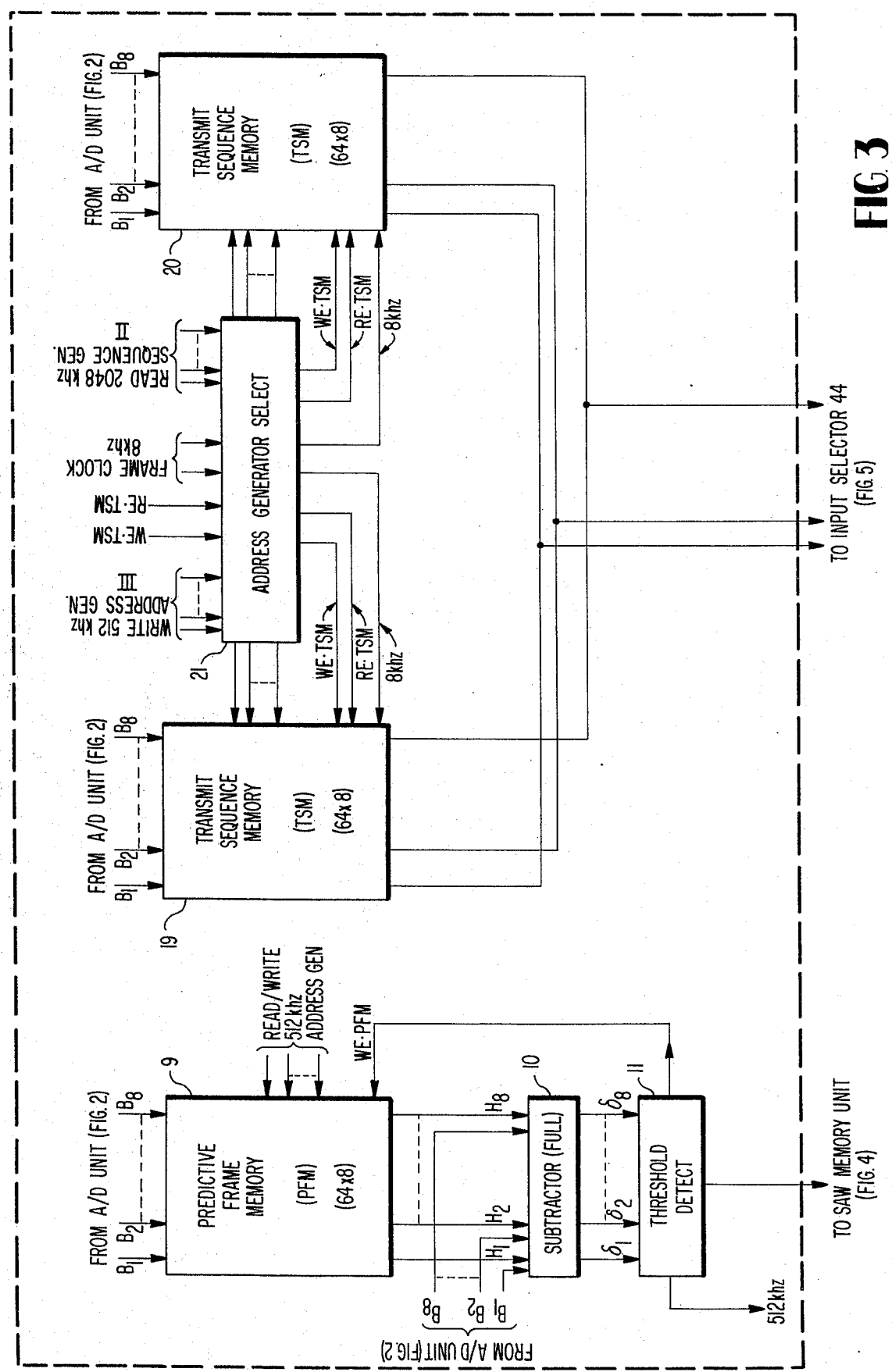
FIG. 3 is a schematic diagram of a processing unit for processing the digital signals at the transmitter.

Referring to FIG. 3, the eight-bit $B_1$ – $B_8$ digital code word $S_i(kT)$ for each voice circuit $C_1$ – $C_{64}$ is then fed as an input to predictive frame memory (PFM) 9 and to a full subtractor 10. Predictive frame memory 9 is a storage register having a capacity of 64 rows (one for each voice circuit $C_1$ – $C_{64}$ with eight bits/row. Full subtractor 10 digitally subtracts, in a manner well-known in the art, the digital code word of the present sample $S_i(kT)$ of the ith voice circuit from the digital code word representing the corresponding prediction $\hat{S}_i(kT) = P_i$ (the corresponding previous sample) comprising 8 bits $H_1$ – $H_8$ stored in PFM 9. The corresponding prediction $\hat{S}_i(kT)$ is read out of PFM 9 by a 512 khz Read/Write address generator (shown in FIG. 6) synchronized with the time at which the correspondind present sample $S_i(kT)$ is fed to the full subtractor 10. The 512 khz Read/Write address generator generates a six-bit digital code word which defines any one of the 64 rows in PFM 9. The output of full subtractor 10 is a digital code word $\delta$ comprising eight-bits $\delta_1$–$\delta_8$ which represents the difference in magnitude between the present sample $S_i(kT)$ and the corresponding precdiction value $\hat{S}_i(kT)$. The digital code word $\delta$ (i.e. "difference" code word) is then fed to threshold detector 11. If the difference code word $\delta$ is greater than a stored threshold $\tau$, threshold detector 11 generates a write enable (WE-PFM) pulse (a logic "1") which is fed to PFM 9 and to serial/parallel converter 12 of the sample assignment word (SAW) memory of FIG. 4. The logic "1" enables PFM memory 9 to substitute the present sample $S_i(kT)$ for $P_i$ (contents of PFM 9) in the correct row defined by the six-bit code word of 512 khz Read/Write address generator. If the difference code word $\delta$ is less than or equal to the threshold $\tau$, threshold detector 11 generates a logic "0" which is fed to serial/parallel converter 12 of the SAW memory of FIG. 4. However, the present sample $S_i(kT)$, being predictable under the predictive encoding algorithm, is not substituted in PFM 9 for $P_1$.

Figure 4:
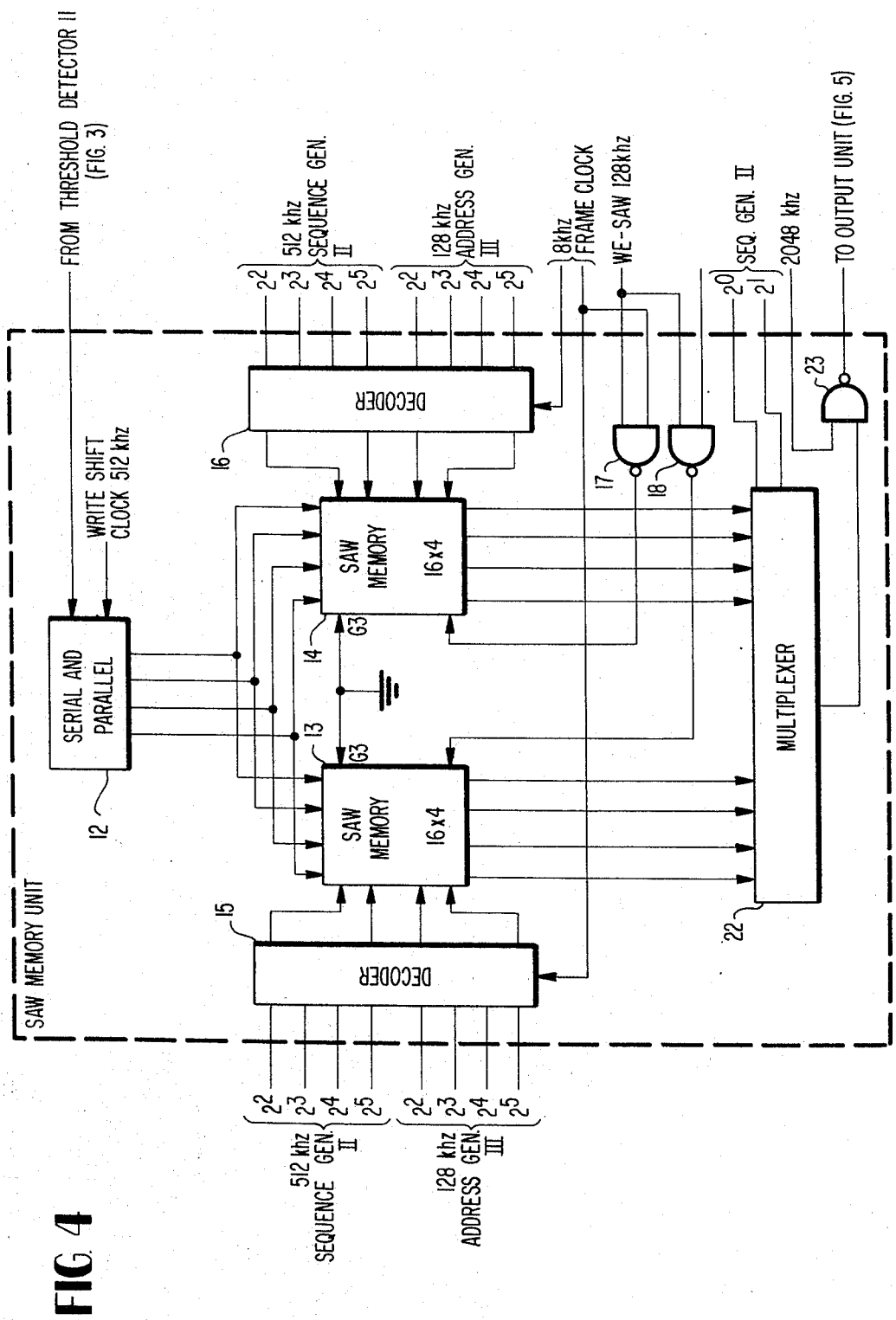
FIG. 4 is a schematic diagram of the sample assignment word (SAW) memory unit of the transmitter.

Referring to FIG. 4, as the 64 comparisons are made, one for each voice circuit sampled, the 64 logic "1's" and "0's" which comprise the SAW are converted, 4 bits at a time, from serial to parallel form by converter 12 and fed in parallel into one of two SAW memory units 13 or 14. SAW memory units 13 and 14 are storage memories having a capacity of 16 rows × four bits/row or 64 bits.

The SAW memory units 13 or 14 are enabled on alternate frame periods via respective decoders 15 and 16, by a 8 khz frame clock (see FIG. 6) and via gates 17 and 18, which are enabled every 128 khz by a write enable (WE-SAW) pulse, to write in the SAW associated with the present predictable and unpredictable voice samples for that frame. Decoders 15 and 16 decode a 4-bit word from the SAW word write address III (FIG. 6) which defines one of 16 rows for the SAW memories 13 and 14 whereby each group of four bits of the SAW is placed in a respective SAW memory. While one SAW memory, for example memory 13, is writing in the SAW of the present frame, the other is reading out the SAW of the previous frame.

While the present samples $S_i(kT)$ from voice circuits $C_1$ – $c_{64}$ are being compared in full subtractor 10 with the contents $P_1$ – $p_{64}$ of the PFM 9, the present samples $S_1(kT)$ – $S_{64}(kT)$ are being written into one of the two transmit sequence memories (TSM) 19 or 20 of FIG. 3. Each TSM 19 or 20 is a storage memory having a capacity of 64 rows by 8 bits/row and is enabled to write-in the present samples during alternate frame periods (while the other memory is reading-out samples from the previous frame) via an address generator select 21 by the 8 khz frame clock. Address generator select 21 is merely a set of switches which transfer the time and address signals to the proper TSM 19 or 20, as would be well-known. There is, therefore, stored in TSM 19 or 20 all present samples $S_i(kT)$ from voice circuits $C_1$ – $C_{64}$.

The manner in which the information to be transmitted, comprising 24 time slots for voice information and eight time slots for the SAW, is readied for transmission will now be described. In this discussion it is assumed the 64 present samples $S_i(kT)$ have been compared and stored (actually, while the present samples are being compared and stored, it is the unpredictable samples of the previous frame which are being readied for transmission). Assuming the SAW associated with the 64 present samples has been written into SAW memory 13 (while this was happening SAW memory 14 was reading out the SAW corresponding to the previous frame) it is now ready to output its contents. The row containing the first bit of the SAW to be read from the SAW memory 13 is defined by decoder 15. Decoder 15 receives from the sequence generator II (see FIG. 6), a four-bit code word (the four most significant bits) defining one of the 16 rows in SAW memory 13 while multiplexer 22 receives a two-bit code word (the 2 least significant bits) from the sequence generator which define where in the row the first bit to be outputted is located. Decoder 15 would initially decode the four-bit word corresponding to the row in SAW memory 13 in which is stored the bit associated with a particular voice circuit, and upon transfer of the row to multiplexer 22, the two-bit word would define the position in the row where the bit associated with that voice circuit is located.

Figure 5:
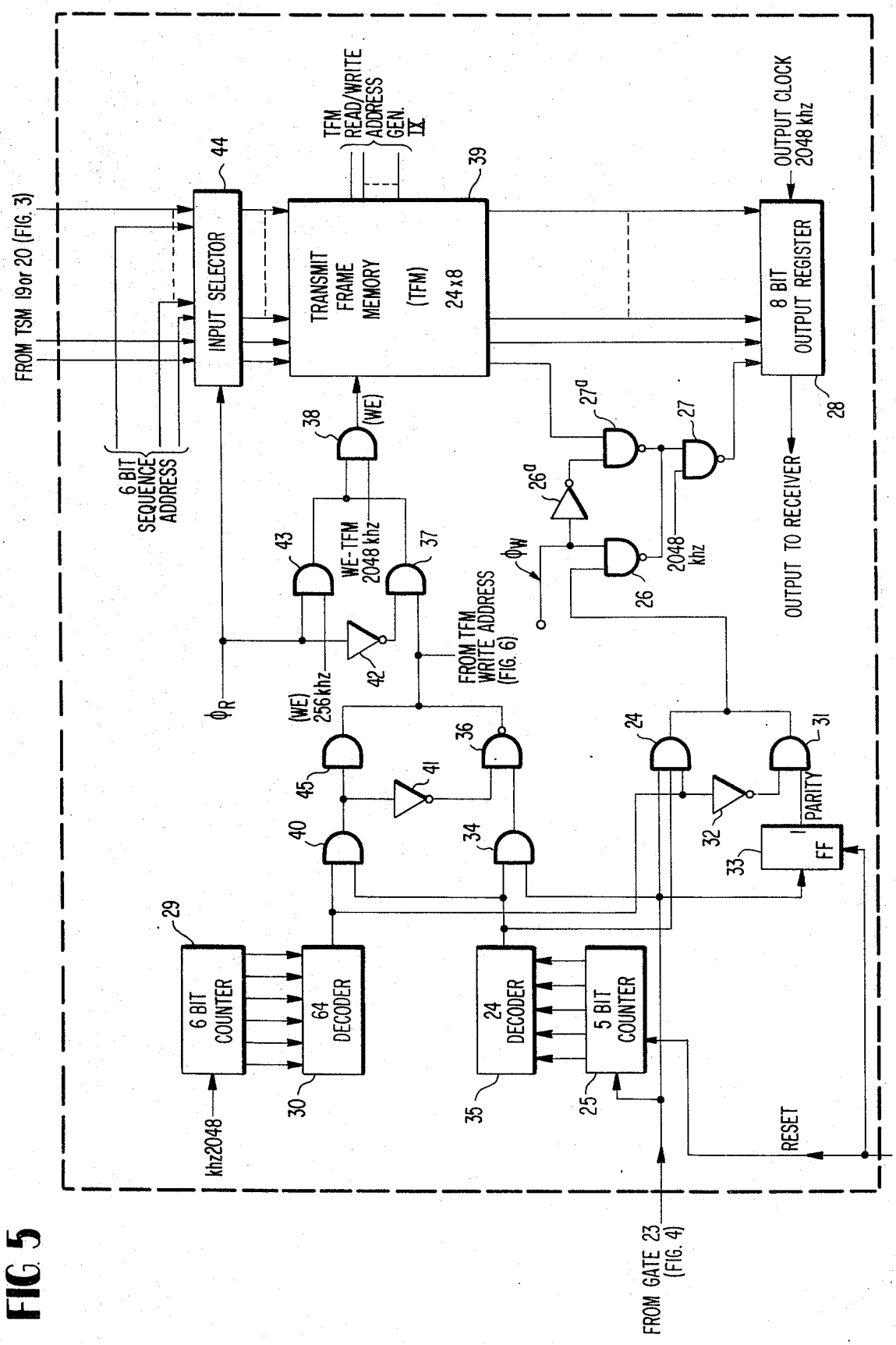
FIG. 5 is a schematic diagram of an output unit which develops the frame of information to be transmitted.

The SAW is clocked at a rate of 2048 khz via AND gate 23 to AND gate 24 and five-bit counter 25 which comprise part of the output unit of FIG. 5. Gate 24 is enabled to pass the first 63 bits of the SAW via gates 26 and 27 to output register 28. A 6-bit counter 29 synchronized with the first bit of the SAW commences counting at the SAW bit rate (2048 khz), and when a count of 63 is reached, a decoder 30 decodes the count 63. In response to the decoding of the count 63, decoder 30 switches from logic "1" to logic "0" thereby inhibiting gate 24 and enabling gate 31 via inverter 32.

The function of gate 31 is to pass a parity bit as the 64th bit of the SAW, rather than passing the 64th bit of the SAW. A parity bit is generated from the first 63 bits of the SAW and used by the receiver to check for the occurrence of an odd number of errors in the SAW being received. The reason for a parity bit will be further discussed in relation to the receiver of the SPEC system. If it is predetermined that the SAW should always contain an even number of "1's," then the receiver will expect to receive a SAW having an even number of "1's". The parity bit (i.e., 64th bit of the SAW) would then be a logic "1" if the first 63 bits contain an odd number of "1" bits. This is accomplished by feeding the SAW from gate 23 to flip-flop 33 which changes state each time a logic "1" passes through. If, at the 64th bit flip-flop 33 is at "1", then a decision is made that the parity bit is set equal to logic "1". If flip-flop 33 is at logic "0", then the parity bit is set to logic "0". The parity bit is passed through gates 26 and 27 via gate 31 to output register 28.

The SAW is also fed to AND gate 34 which is inhibited when decoder 35 has decoded a count of 24 from counter 25. Counter 25 receives the SAW and counts the number of "1"'s in it. Upon reaching a count of 24, counter 25 feeds a 5 bit number defining that count to decoder 35 for decoding. Until a count of 24 is reached, the SAW is fed via gate 34 to gates 36, 37 and 38. Gate 38, if enabled, will pass a write enable (WE) pulse to transmit frame memory (TFM) 39 for each of the first 24 "1's" in the SAW.

Gates 34, 36, 37 and 38 will be enabled as follows: If the SAW contains a "1" and counter 25 has not reached a count of 24, then gate 34 will be enabled to pass the "1" bit. Then, if the counter 29 has not reached a count of 63 (indicating that this particular bit is part of the SAW associated with the information being prepared for transmission), gate 45 is not enabled, and an enabling level via inverter 41 is fed to gate 36 enabling the "1" bit to pass. The "1" bit is then passed through gate 37 which receives its enabling level from inverter 42 when transmit frame memory (TFM) 39 is not in its readout condition. The "1" bit is then fed to gate 38 which is enabled from gate 43 when the latter is receiving a write enable (WE) pulse which enables TFM 39 to write-in samples from TSM 19.

As the 64 bits of the SAW are fed to the output unit of FIG. 5, the TSM 19 shown in FIG. 3 receives the six-bit code word from the sequence generator II (see FIG. 6) via address generator select 21. the six-bit code word from the sequence generator II defines the row in which the voice sample corresponding to the first bit read-out of multiplexer 22 is situated. As the sequence generator enables in a pseudo-random sequence, each row, if a write enable (WE)pulse from gate 38 shown in FIG. 5 corresponding to a particular bit of the SAW representing the associated voice circuit enables TFM 39, then the sample in that row is transferred via input selector 44 to TFM 39. Input selector 44 is a set of logic gates enabled to pass either the samples from TSM 19 or a code word defining the particular pseudo-random servicing sequence under consideration, as will be further described. When the first "1" bit causes a write enable (WE) pulse from gate 38, the sequence generator II will be enabling a row in the TSM 19 thereby resulting in the transfer of the sample in that row from TSM 19 to TFM 39. TFM 39 receives a five-bit code word from TFM Read/Write Address Generator (FIG. 6) defining a row in which to store the transferred samples and thereafter output them. This first unpredictable sample will then eventually be transmitted in time slot $T_1$ of the transmission frame. In a like manner when the second "1" bit of the SAW enables the TFM 39 the sample in another row of the TSM 19 enabled by the sequence generator II will be transferred to TFM 39 and eventually will appear in time slot $T_2$ of the transmission frame. In a like manner all unpredictable present samples are transferred to TFM 39. After all unpredictable samples are loaded in TFM 39 and the SAW fed to output register 28, the rows in TFM 39 are sequentially enabled by the TFM Read/Write Address Generator to output the samples on a row-by-row basis from the TFM 39 to output register 28 upon the enabling of gate 27a via inverter 26a. The output of output register 28 will then be, in series, 64 bits of the SAW followed by 24 time slots $T_1 - T_{24}$ comprising the unpredictable samples which are then transmitted to a receiver.

Continuing with a discussion of the output unit of FIG. 5, assume that in a particular frame there are less than 24 voice circuits which are unpredictable. This means that not all of the transmission time slots $T_1 - T_{24}$ will be filled. Advantage is taken of the available time slots to transmit therein the six-bit sequence code word which defines the particular servicing sequence corresponding to the frame number. For example, the six-bit code word (plus two dummy bits to fill the eight-bit time slot) in counter 101 in sequence generator II defining the starting point or sequence code word would be transmitted. The purpose of this, as will be hereinafter more fully explained, is to periodically re-synchronize the receiver pseudo-random sequence generator so that the correct pseudo-random sequence associated with the transmitted frame of information is generated at the receiver. Also in place of the two dummy bits mentioned above, two parity check bits could be used to make a check at the receiver to determine if the sequence code word is being properly received. The parity check bit would be added as discussed previously with respect to the SAW parity check.

The manner in which the 6-bit sequence code word is added to the transmission frame is as follows. The condition under which the decision to transmit the sequence code word is that counter 25 has not reached a count of 24 (indicating there are less than 24 logic "1's" in the SAW) whereas counter 29 has reached a count of 64 (indicating that the complete SAW has been counted). Under this condition none of the gates 34, 36, 37, 38, 40, 45 are enabled. As a result, the six-bit sequence code word generated by the sequence generator II is forced into the available rows in TFM 39 via input selector 44 and thereafter eventually occupies the available time slots of the transmission frame. (As noted above, two parity check bits may be added to the sequence code word to provide an eight-bit word.)

Under "overload" conditions, counter 25 has reached a count of 24 prior to counter 29 reaching a count of 64. Accordingly, at the count of 24 decoder 35 switches to logic "0" thereby disabling gate 34. As a result, no further "1's" in the SAW, which would cause gate 38 to emit a write enable (WE) pulse, are passed by gate 34, and the voice samples in TSM 19 associated with the latter "1's"(i.e., beyond the 24th) cannot be transmitted. This condition results in an amplitude error due to "overload" since the receiver will use corresponding previous samples to reconstruct the unpredictable samples which couldn't be transmitted.

To alleviate sample (i.e. amplitude) error due to "overload", the servicing sequence is continuously varied in a pseudo-random manner according to the present invention. In FIG. 6, the sequence generator II is composed of two pseudo-random generators. The first of these generates the six-bit sequence code word. This six-bit sequence code word is the starting point for the second pseudo-random generator which generates the SAW address. The first pseudo-random generator comprises a six-bit counter 101 and an Exclusive OR circuit 102 which is connected to feed back the outputs of the two most significant stages of the counter to the least significant stage of the counter. Counter 101 counts in response to clock pulses from an 8khz clock. The outputs of each stage of counter 101 are connected to respective AND gates 103. Gates 103 are enabled by the 8khz clock delayed by delay circuit 104. The purpose of the delay circuit 104 is to allow time for the count in counter 101 to settle before it is read out by gates 103 to load counter 105 of the second pseudo-random generator. Counter 105 is a six-bit counter like counter 101 and also has an Exclusive OR circuit 106 connected to feed back the outputs of the two most significant stages of counter 105 to the least significant stage. Counter 105 counts in response to clock pulses from a 512 khz clock. Thus, counter 105 counts at a rate which is 64 times that of the counting rate of counter 101 thereby generating each of the 64 SAW addresses for each sequence code word generated in counter 101. The outputs of each stage of counter 105 are connected to respective AND gates 107 which are enabled by the 512 khz clock delayed by delay circuit 108. Again, the purpose of delay circuit 108 is to allow time for the count in counter 105 to settle before it is read out by gates 107. The four most significant bit outputs from gates 107 are connected to decoders 15 and 16 (see FIG. 4), while the two least significant bit outputs are connected to multiplexer 22 as previously explained.

Since pseudo-random sequence generators can never generate the all-zero output state, gate 109 decodes the binary 63 state (all-ones) in counter 105 and sets a flip-flop III. When set, flip-flop III inhibits gate 112 thereby blocking the 512 khz clock pulse to counter 105. Flip-flop III is reset every clock pulse by the output of delay circuit 108. Thus, the binary 63 state is detected, the 512 khz clock is inhibited for one clock period during which the all-zero output state appears on the output address.

Figure 7:
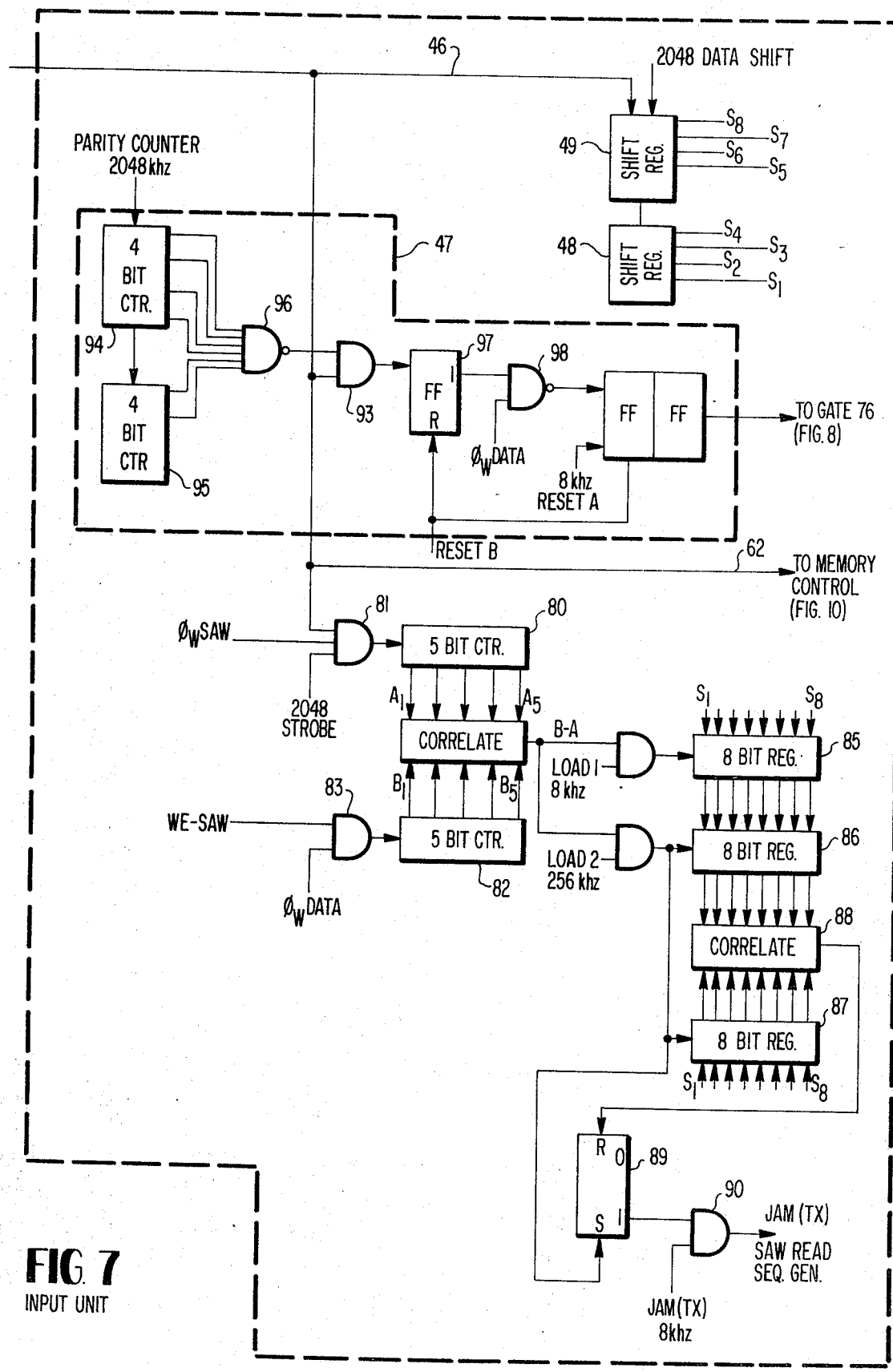
FIG. 7 is a schematic diagram of an input unit at the receiver which receives the frame of information transmitted.
Figure 8:
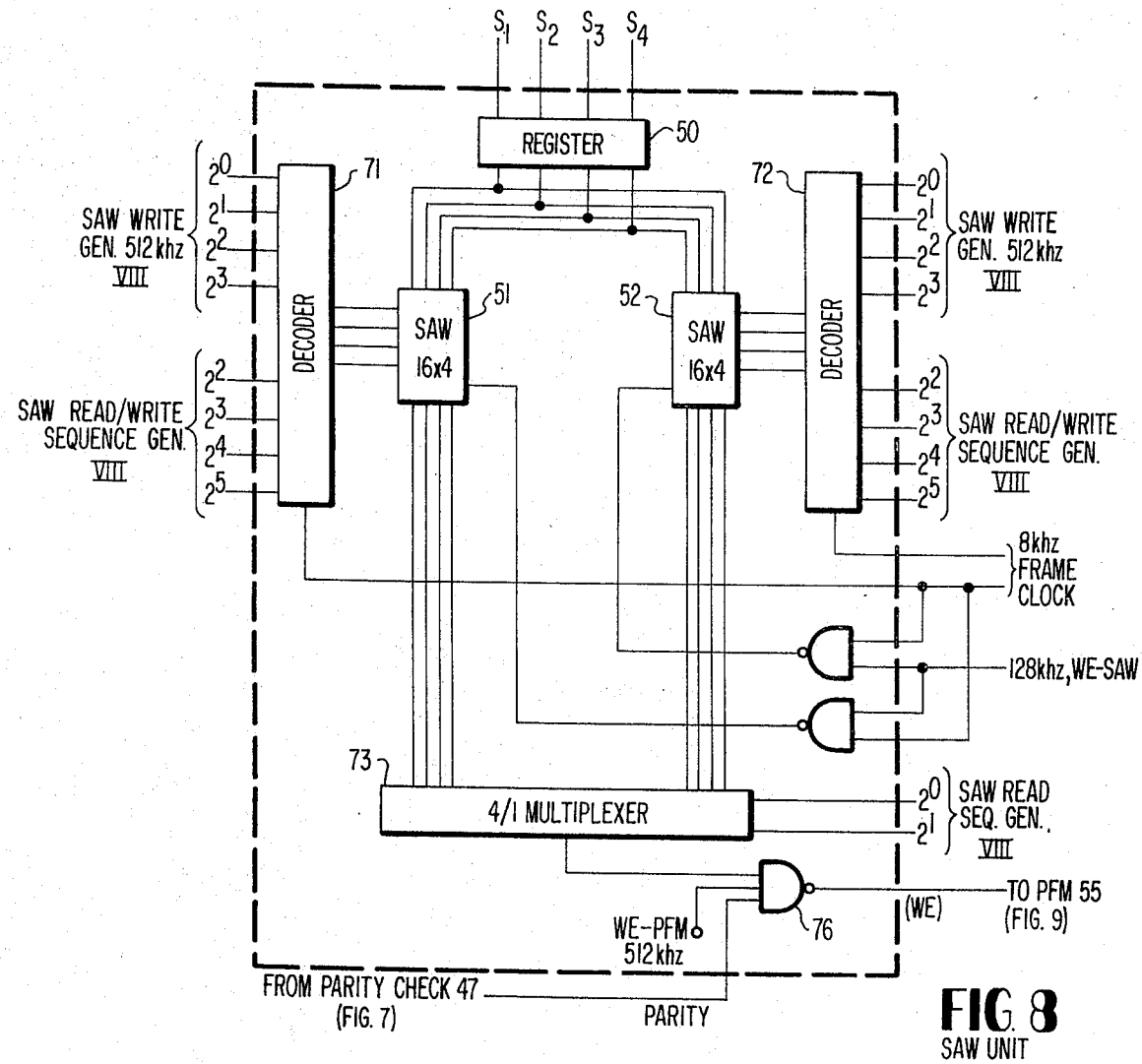
FIG. 8 is a schematic diagram of a sample assignment word (SAW) memory unit of the receiver.
Figure 11:
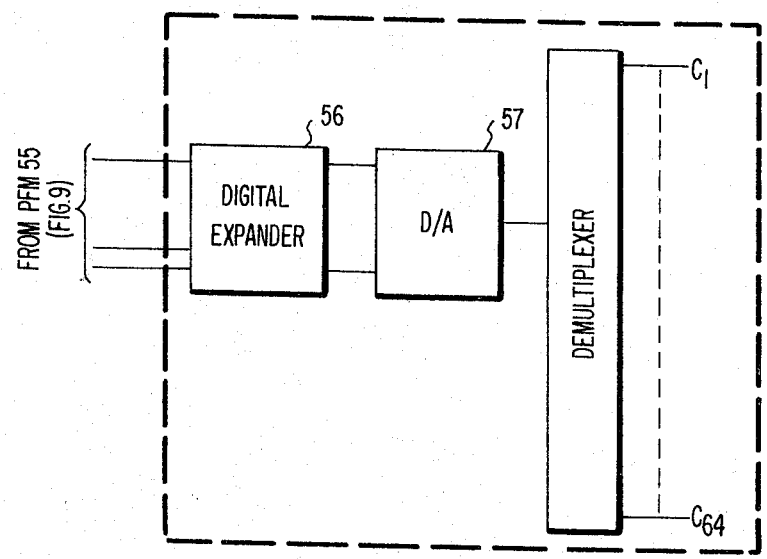
FIG. 11 is a block diagram of equipment used for the digital-to-analog conversion of the received signals.
Figure 9:
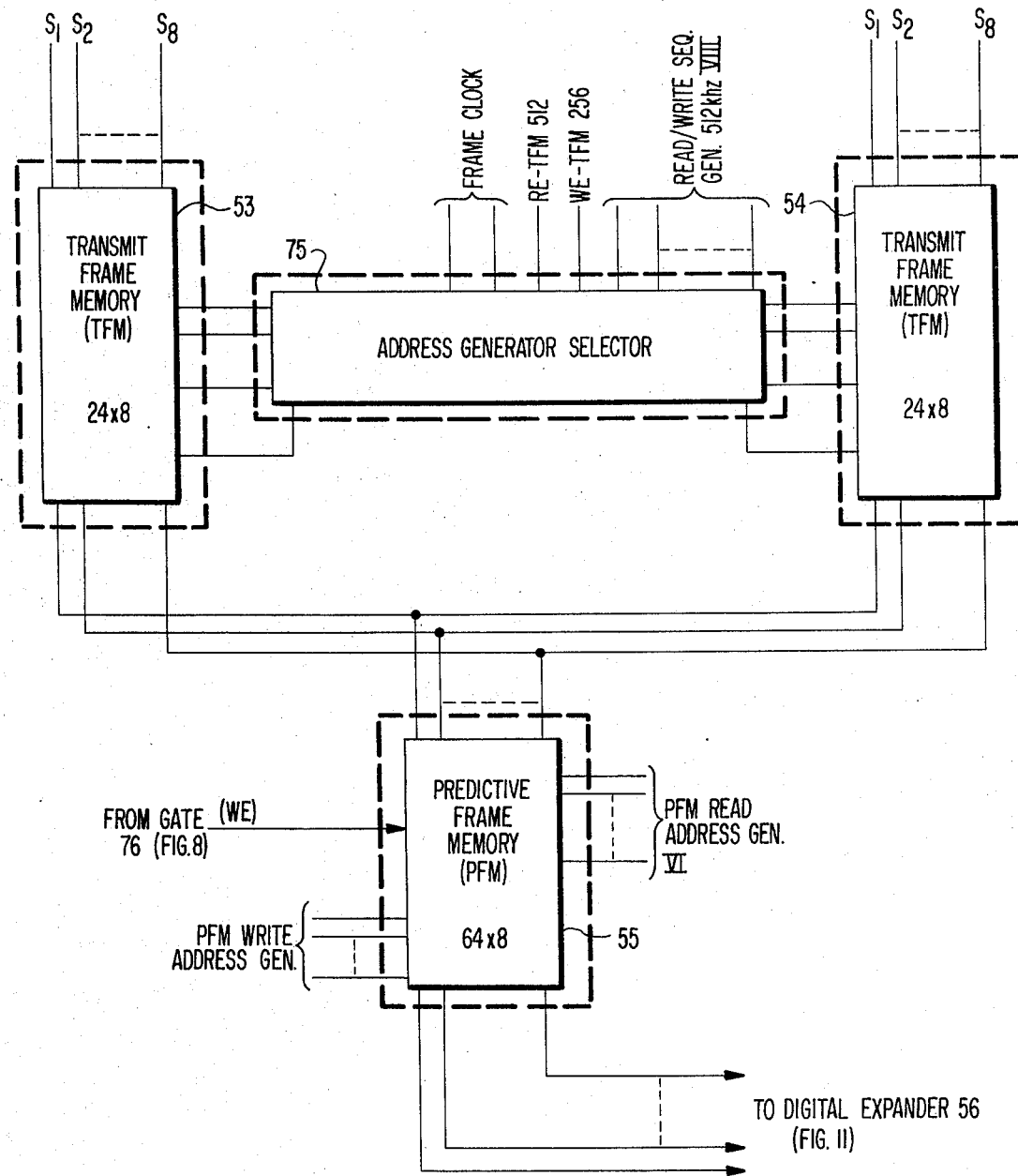
FIG. 9 is a schematic diagram of the processing unit of the receiver for processing the received digital signals.

Referring to FIG. 7 there is disclosed a schematic diqgram of an input unit at the receiver which receives the frame of information transmitted. The received information comprising, in series, 64 bits of the SAW and 24 time slots $T_1 - T_{24}$ of voice information is received on input line 46. The SAW is fed to parity check apparatus 47 and four-stage shift register 48. The SAW is then fed, four bits at a time, to shift register 50 (FIG. 8) where it is then transferred, 4 bits at a time, into one of two SAW memory units 51 or 52. As with the SAW memories 13 and 14 at the transmitter, the SAW memory units 51 and 52 operate during alternate frame periods to write and read the SAW. During one frame, for example, while memory 51 is accepting the received SAW, memory 52 is outputting the previously received SAW. The operation of these memory units is controlled by the 8 khz frame clock and the 128 khz write enable (WE-SAW) pulses from the memory control unit (FIG. 10). After the received SAW is stored in one of the memories, for example memory 51, the channels of information $T_1 - T_{24}$ are received and transferred to the two four-bit shift registers 48 and 49. Each received sample comprising eight bits is then shifted into one of two transmission frame memories (TFM) 53 or 54 (FIG. 9). As with the transmission sequence memories (TSM) 19 and 20 at the transmitter, the transmission frame memories 53 and 54 operate during alternate frame periods to write and read the received code words in time slots $T_1 - T_{24}$. Again during one frame period while, for example, TFM 53 is writing-in the received samples, the previously received samples are being read from memory 54.

Assuming the presently received frame of information is stored in the respective SAW memory unit 52 and TFM 54 and a parity check (described later) has indicated that the received SAW was not corrupted by an odd number of errors, the manner in which the 64 voice circuits at the receiver are up-dated will now be described. In doing so, it should be noted that though there is an effective pseudo-random servicing sequencing of the voice circuits at the transmitter, the voice circuts $C_1 - C_{64}$ are always initially sampled in a set sequence starting with voice circuit $C_1$ and sequencing through voice circuit $C_{64}$. Accordingly, the de-multiplexer at the receiver must also de-multiplex the updated frame of information of the 64 voice circuits starting with voice circuits $C_1$ and sequencing through voice circuit $C_{64}$. It is therefore necessary that predictive frame memory (PFM) 55 deliver the frame of information to the digital expander 56 and eventually to the digital-to-analog converter 57 in a set sequence starting with voice circuit $C_1$ and sequencing through voice circuit $C_{64}$.

The TFM 54, which is a memory having 24 rows of eight bits/row, receives and stores the transmitted samples $T_1 - T_{24}$ in the order received. Thereafter, it is necessary to transfer the unpredictable samples in TFM 54 to PFM 55 starting with the first unpredictable sample in TFM 54, placing that sample in the row of PFM 55 corresponding to that voice circuit followed in sequence by the active voice circuits in the order stored in TFM 54. To be able to transfer the samples from TFM 54 to PFM 55 in a manner for proper reconstruction of the 64 voice circuits it is necessary to know the pseudo-random sequence which was transmitted. This is accomplished by providing the receiver with a pseudo-random sequence generator identical to the pseudo-random sequence generator in the transmitter. This generator IX in FIG. 10 has first and second six-bit counters 119 and 121 corresponding to counters 101 and 105. Counter 119 receives the sequence code word and counts in response to an 8khz clock. The code word in counter 119 is transferred with each 8khz clock pulse to counter 121 which counts in response to a 512 khz clock. Accordingly, in response to a clock synchronized with the reception of the first bit of the SAW, the counter 121 of the pseudo-random sequence generator of the transmitter emits a six-bit code word representing the correct PFM write address of the voice circuit corresponding to the firstt bit of the SAW. With the next clock pulse, the counter 121 emits a new six-bit code word representing the PFM write address of the voice circuit corresponding to the second bit of the SAW. This process continues until all 64 addresses have been generated in the transmitted pseudo-random sequence for that particular frame.

While the foregoing is occurring the SAW read address generator (counters 58 and 59) has transferred a four-bit code word (the four most significant bits of the sequence code word) to the decoder 72 (FIG. 8) and a two-bit code word (the two least significant bits of the sequence code word) to multiplexer 73. A "1" from memory 52 is fed via multiplexer 73 to predictive frame memory (PFM) 55 via gate 76 to serve as a write enable (WE) pulse. At the time the write enable (WE) pulse is received, the PFM 55 has also received a code word from the PFM write address generator IX (see FIG. 10) as just described. Accordingly, in response to the write enable pulse the first row of 54 containing an unpredictable sample is transferred from the TFM 54 to the row of PFM 55 corresponding to that particular voice circuit. Each time a "1" is emitted from SAW memory 52 and multiplexer 73, the PFM write address generator IX causes the next unpredictable sample in the TFM 54 to be written in the row in PFM 55 corresponding to that particular voice circuit. Consequently, each time a "1" is emitted from SAW memory 52, the unpredictable sample in TFM 54 is properly transferred to the PFM 55 in a manner heretofore discussed wherein the unpredictable sample replaces the corresponding previous sample stored therein. In this manner, the sampling sequence is "de-sequenced".

After the frame is analyzed and all the unpredictable samples are transferred to the PFM 55, the samples from voice circuit $C_1 - C_{64}$ are sequenced out of PFM 55 and fed to digital expander 56. Digital expander 56, well-known in the art, expands each eight-bit sample to a 12-bit sample and transfers the sample to a digital-to-analog converter 57 wherein each sample is converted to analog form. Thereafter, the analog samples are demultiplexed and fed to the proper receive circuits $C_1 - C_{64}$.

As will be recalled from the discussion of the transmitter, if there is an underload condition, the actual 6-bit pseudo-random sequence code word (plus two parity bits) defining the particular pseudo-random servicing sequence is transmitted in one of the unused channels. The purpose of this was to re-synchronize the receiver to the particular pseudo-random sequence being transmitted in the event that the pseudo-random sequence generator of the receiver might not be in synchronization with the pseudo-random sequence generator of the transmitter. Therefore, assuming an underload condition, the SAW, as it is received over line 46, is fed to a five-bit counter 80 of FIG. 7 via gate 81 wherein five-bit counter 80 counts the number of "1"'s in the SAW. Meanwhile, the five-bit counter 82 via gate 83 counts the number of samples transferred into TFM 54 during that frame. If the number from counter 82 is greater than the number in counter 80 when correlated in correlator 84, then an underflow condition is indicated. In response to this condition, the sequence code word which has been transmitted in a manner similar to the parity check made on the receiver SAW (later described) in several of the available time slots is first checked for parity and then fed to register 85 and then transferred to register 86 during the next clock period. During that next clock period, the contents of the next time slot, which should be the same as the contents of register 86, is transferred to register 87. Then correlator 88 correlates these two code words and if they are the same, it is an indication that the sequence code word was transmitted without error. In response thereto, flip-flop 89 changes state enabling gate 90 which causes the transmitted sequence code word to be jammed into counter 119 of th sequence generator for use as the receiver generated sequence code word. In this manner, the receiver is insured that it is de-sequencing the particular frame under the right sequence.

A parity check is made at the input unit of the receiver to determine if an even number of the "1" bits in the SAW is being received. If the parity check indicates there is an even number of "1's," then the receiver is allowed to process the received unpredictable samples associated with the SAW to enable reconstruction of the voice samples in the frame. However, if the parity check indicates than an odd number of "1's" in the SAW has been received (due, for example, to the corruption of one of the bits in the SAW by channel noise), then the receiver is not allowed to process the unpredictable samples since the channel routing information provided by the SAW is incorrect. Instead, the receiver reconstructs the samples already stored in PFM 55 without updating those samples with the received unpredictable samples. This will result in an amplitude error; however, this error will be slight since the samples which should have been updated will be close in value to their corresponding unpredictable samples.

To make a parity check, as the SAW is being received each time a "1" appears gate 93 is enabled via an enabling level from four-bit counters 94, 95, and gate 96. Each time gate 93 is enabled, the flip-flop 97 changes state. If after the entire SAW is received flip-flop 97 is in the state indicating a parity check, then an enabling level via gate 98 is fed to one of two flip-flops, there being one flip-flop associated with TFM 53 and one associated with TFM 54, which outouts an enabling level to gate 76 thereby enabling the substitution of unpredictable samples in PFM 55. If a parity check is not indicated, the gate 76 does not receive an enabling level and the unpredictable samples transmitted with the SAW are not processed.

As described herein, the present invention employs a pseudo-random change of the service priorities each frame in order to not only uniformly distribute the amplitude error due to overload, but also to approximate the $n/2$ average priority of service in less than $n$ frames. This feature of the invention is accomplished by sequencing the sampe assignment priorities at the transmitter and "de-sequencing" the sample assignment at the receiver. The transmitter updates the starting point in the pseudo-random sequence every frame. The receiver makes use of this fact by also undating in the pseudo-random sequence every frame.

An alternate method of accomplishing the recirculation feature of the present invention is to perform both the "sequencing" and "de-sequencing" operations at the transmitter. That is, the service priorities are sequenced as previously described. However, before the output frame is transmitted, both the sample assignment word and the transmitted samples ($T_1$ thru $T_{24}$) are "de-sequenced" so that the receiver always receives the SAW in the correct order (i.e. 1, 2, ... 64) and the sample $T_1$ always corresponds to the lowest order active circuit relative to circuit $C_1$.

The implementation of de-sequencing at the transmitter would require a TSM (A) connected to a TFM (A) and a SAW memory ($A_1$) associated with TSM(A) and a SAW memory ($A_2$) associated with TFM(A) as well as a TSM (B) connected to a TFM(B) and a SAW memory ($B_1$) associated with TSM (B) and a SAW memory ($B_2$) associated with TFM(B).

De-sequencing at the transmitter would occur in the following manner. During a given frame, the samples from circuits $C_1 - C_{64}$ would be written into TSM(A) in order from $C_1 - C_{64}$. While this is occurring, the samples from the previous frame (which are already stored in TSM(B) in order from $C_1 - C_{64}$) are operated on wherein the unpredictable samples are transferred from TSM(B) to TFM(B) in accordance with the particular pseudo-random servicing sequence associated with that frame so that TFM(B) has stored therein the unpredictable samples from the lowest active circuit relative to the servicing sequence stored in the first row. The manner in which the transfer is made from TSM(B) to TFM(B) is similar to the previously described method of transferring samples from TSM 20 to TFM 39.

While the above transfer from TSM(B) to TFM(B) is occurring the TFM(A) is being de-sequenced. TFM(A) is addressed starting with the lowest active circuit relative to circuit $C_1$ so that the time slots $T_1 - T_{24}$ comprise unpredictable samples wherein time slot $T_1$ has the sample from the lowest active circuit relative to circuit $C_1$. The SAW which is stored in SAW(A) would output as its first bit the bit relating to circuit $C_1$ followed in sequence with the bits relating to circuits $C_2 - C_{64}$. The manner in which the bit associated with circuit $C_1$ is located would be similar to that disclosed for the de-sequencing operation at the receiver. The transmission frame would not be de-sequenced and comprise, in order, the SAW having a series of bits associated respectively with circuits $C_1 - C_{64}$, followed by time slots $T_1 - T_{24}$ wherein $T_1$ comprises the lowest active circuit relative to circuit $C_1$, $T_2$ comprises the next active circuit relative to circuit $C_1$, and so on.

With the de-sequencing at the transmitter, there would be significant simplifications in the memory control units in both the transmitter and receiver. The reason for this is that since there are less operations occurring simultaneously but rather over several frame periods (the transmission frame comprises unpredictable samples two frame periods removed from the present servicing frame) duplicate memory controls at the transmitter and at the receiver are not necessary to perform the simultaneous operations.

It should also be noted that though the receiver will automatically know where in the SAW the bit relating to circuit $C_1$ appears, the parity bit will occupy any one of 64 positions in the SAW over a 64 frame period. The receiver though, would be able to locate the position of the parity bit in the SAW as it was able to locate the position of the bit relating to circuit $C_1$ when de-sequencing occurred at the receiver. In this manner, a parity check may be made to determine if the correct SAW has been received.

What is claimed is:

1. In a digital communications system wherein information from a plurality of voice circuits at a transmitting station may be transmitted to a receiving station via a transmission path as a digitally encoded frame of information representing a predetermined maximum number of voice circuits less than said plurality, said communications system including means at the transmitting station for periodically sampling the amplitude of voice signals on each circuit of said plurality of voice circuits, means for comparing for each of said circuits a present amplitude sample with a prior amplitude sample which has been transmitted to said receiving station, and means for generating a transmission frame comprising a digital representation of those present amplitude samples which differ from the corresponding prior amplitude samples by a predetermined amount, the improvement comprising:

means for pseudo-randomly changing the order by which all voice circuits are serviced during successive transmission frames, and means for generating as part of said transmission frame a digital sample assignment word representing all voice circuits in the pseudo-random servicing sequence of that frame and identifying those circuits having digital representations of present amplitude samples included in the frame.

2. In a digital communications system, the improvement recited in claim 1 further comprising means for generating, as part of a transmission frame when less than said maximum number of voice circuits have present amplitude samples that differ from corresponding prior amplitude samples by said predetermined amount, a digital sequence code word representing the starting point of the particular pseudo-random servicing sequence of that frame.

3. In a digital communication system as recited in claim 1 further including means at said receiving station for receiving said digitally encoded transmission frame, and storage means for storing for each voice circuit digitally encoded from a prior sampling frame, said improvement further comprising:

pseudo-random sequence generating means at said receiving station for generating the order by which voice circuits were serviced in a received transmission frame, and means connected to said receiving means and controlled by said pseudo-random sequence generating means for substituting for the samples stored in said storage means respective transmitted present samples in accordance with said digital sample assignment word.

4. In a digital communication system as recited in claim 2 further including means at said receiving station for receiving said digitally encoded transmission frame, and storage means for storing for each voice circuit digitally encoded samples from a prior sampling frame, said improvement further comprising:

pseudo-random sequence generating means at said receiving station for generating the order by which voice circuits were serviced in a received transmission frame, means connected to said receiving means and controlled by said pseudo-random sequence generating means for substituting for the samples stored in said storage means respective transmitted present samples in accordance with said digital sample assignment word, and means responsive to said digital sequence code word for re-synchronizing said pseudo-random sequence generating means at said receiving station.

5. In a digital communications system, the improvement recited in claim 2 wherein said means for pseudo-randomly changing the servicing order of said voice circuits includes a pseudo-random sequence generating means comprising:

a first counter driven by a clock having a frequency equal to the frame rate, a first Exclusive OR circuit connected to feed back the outputs of selected stages to the input of said first counter, said first counter generating said digital sequence code word, a second counter driven by a clock having a frequency equal to the frame rate multiplied by the total number of voice circuits serviced, a second Exclusive OR circuit connected to feed back the outputs of selected stages to the input of said second counter, said second counter generating in a pseudo-random manner addresses of all of said voice circuits during each frame period, and sampling means operating in synchronism with said first counter for transferring the contents of said first counter into said second counter.

6. In a digital communications system as recited in claim 5 further including means at said receiving station for receiving said digitally encoded transmission frame, and storage means for storing for each voice circuit digitally encoded samples from a prior sampling frame, said improvement further comprising:

a second pseudo-random sequence generating means at said receiving station for generating the order by which voice circuits were serviced in a received transmission frame, said second pseudo-random sequence generating means including third and fourth counters corresponding to said first and second counters, respectively, means connected to said receiving means and controlled by said fourth counter for substituting for the samples stored in said storage means respective transmitted present samples in accordance with said digital sample assignment word, and means responsive to said digital sequence code word for re-synchronizing said pseudo-random sequence generating means by loading said digital sequence code word into said third counter.

* * * * *